INVENTORS
STANLEY A. DUNN
LAWRENCE F. RAKESTRAW

BY

ATTORNEY

United States Patent Office 3,516,478
Patented June 23, 1970

3,516,478
APPARATUS FOR SEPARATION OF IMPURITIES FROM METAL MELTS IN A FILAMENT SPINNING DEVICE
Stanley A. Dunn, Verona, Wis., and Lawrence F. Rakestraw, Raleigh, N.C., assignors to Monsanto Company, St. Louis, Mo., a corporation of Delaware
Filed Dec. 5, 1967, Ser. No. 688,165
Int. Cl. B22d 11/10
U.S. Cl. 164—281                6 Claims

ABSTRACT OF THE DISCLOSURE

A low viscosity metal melt which is contained by a heated crucible is passed through a hearth plate which is positioned in the heated crucible to free the melt of insoluble non-metallic film and particle inclusion impurities prior to being extruded through a spinning orifice to form metal fibers. The openings in the hearth plate through which the melt passes have cross-sectional areas each of which is greater than the cross-sectional area of the spinning orifice.

BACKGROUND OF THE INVENTION

Field of invention

This invention relates to the removal of insoluble non-metallic film and particle inclusion impurities from a low viscosity metal melt and, more specifically, in combination with a heated crucible, to the provision of a hearth plate which divides the crucible interior into first and second reservoirs and which removes the insoluble impurities from the melt as it passes from the first reservoir through the hearth plate into the second reservoir.

Description of prior art

The basic process and apparatus for removing particle and film impurities from any conventional liquid is well known. Water, spin dope for forming synthetic fibers and other liquid chemicals may be filtered by passing the liquid through a conventional filter which may be wire, paper, cloth or the like. The openings in the filter through which the liquid passes are smaller than the particles suspended by the liquid. Essentially, such a filter traps the particles and thereby prevents passage of the particles through the same. Therefore, the art has developed the premise that the smaller the suspended particle the smaller the openings in the filter must be to trap the particles and prevent passage therethrough. Where the particles are substantially microscopic, osmosis is generally employed to separate the particle impurities from the suspension liquid.

In this invention, the particles are smaller than the spinnings through which the metal melt passes. The observed phenomenon of removing film and particle impurities from a melt by passing the melt through passageways in a hearth plate which are larger than the impurities removed is believed to be unique and substantially unobvious in view of the prior art.

SUMMARY OF THE INVENTION

The spinning of low viscosity metal melts through small diameter orifices to form fibers can only be obtained by using melts which are relatively free of insoluble non-metallic film and particle inclusion impurities. Otherwise, the film and inclusions plug the small diameter orifices and interrupt the spinning runs.

The use of simple filters for removing the impurities is not satisfactory for it is difficult to find non-flaking porous structures of suitable refractory materials which would not introduce inclusions into the spinning charge. Therefore, some means for providing a clean melt in the area adjacent the orifice must be found.

The apparatus of this invention for removing insoluble non-metallic film and particle inclusion impurities from the melt prior to the melt entering the orifice is a hearth plate. The hearth plate is shaped to divide the crucible into first and second reservoirs, the first reservoir receiving the spinning charge during heating up and melting operations and the second reservoir providing the orifice with a supply of impurity free melt. The hearth plate is provided with a plurality of passageways which establish a melt flow path from the first reservoir into the second reservoir and through which the melt passes. The passageways each have a cross-sectional area which is larger than the cross-sectional area of the orifice. Substantially all of the film and inclusion impurities are effectively separated from the melt by the hearth plate as the melt passes through the passageways from the first reservoir into the second reservoir. The efficacy of the hearth plate in removing the impurities from the melt was observed in that at the end of each spinning run, a crust or film of metallic oxide was always found on the top of the hearth plate which is the side away from the spinning orifice and the residual metal on the bottom of the hearth plate was very bright and clean in appearance. Also, the number of spinning interruptions due to plugging of the orifice was considerably reduced.

It is, of course, obvious that a particle inclusion which is larger than the spinning orifice will effectively plug it and interrupt the spinning process. Also, particle inclusions smaller than the spinning orifice will plug the same for the particle inclusions have the tendency to bridge the orifice. Since the cross-sectional area of the passageways extending through the hearth plate is larger than the cross-sectional area of the spinning orifice, it would appear that the particle inclusions would pass through the passaways and into the area adjacent the spinning orifice. However, the particle inclusions do not pass through the passageways of the hearth plate but collect on the upper surface thereof. Quite possibly, the removal of film and particle inclusion impurities in this manner is unique to the filtration of metal melts. One possible explanation for this phenomenon may be that the particle inclusions have an affinity for each other as well as the hearth plate so that they collect on the surface of the hearth plate and along the sides of the passageways thereof. Eventually, of course, substantially all of the passageways will become clogged with the film and particle inclusion impurities; however, the length of the spinning time which may occur without interruption is increased sufficiently to make metal spinning economically feasible whereas such has not previously been the case.

The insoluble film and particle inclusion impurities are present in the metallic charge even though care is taken to form a charge which is substantially free of those impurities. Oxide impurities also result from the oxidation of the exterior surface of the charge prior to being admitted into the heated crucible. The impurities may further result from contamination of the crucible walls even though care is taken to remove all contamination prior to the admittance of the metal charge. The impurities may still further result from the presence of small amounts of air in the spinning chamber which is above the heated crucible and which contacts the melt to form insoluble oxides.

Therefore, an object of this invention is to provide a heated crucible with a hearth plate which is adapted to separate the spinning charge from the orifice during the heating up and melting of the spinning charge.

Another object of this invention is to provide a heated crucible with a hearth plate which serves as a means for removing inclusion and film impurities from the molten metal as the molten metal passes through the hearth plate and into an area adjacent the orifice.

A further object of this invention is to increase the reliability and reproducibility of metal spinning so that a commercial process can be technically feasible.

Yet another object of this invention is to spin a fiber from a low viscosity metal melt which is substantially free of impurities by preventing the impurities from gaining access to the spinning orifice.

These and other objects of this invention will become apparent when the following specification and claims are read in conjunction with the appended drawings, and which:

DETAILED DESCRIPTION OF THE PREFERRED EMBODIMENT

Figure 1:
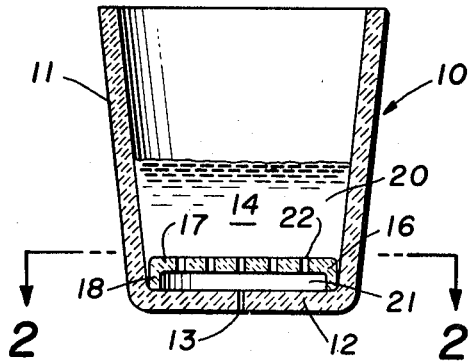
FIG. 1 is a section view taken through the heated crucible and a first embodiment hearth plate and showing the first reservoir containing the impure melt and the second reservoir containing impurity free melt.
Figure 2:
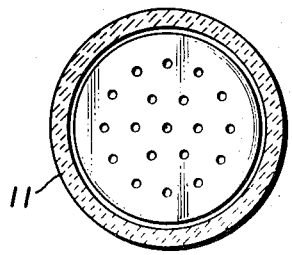
FIG. 2 is a section view taken along lines 2—2 of FIG. 1 and showing the upper surface of the hearth plate.

With reference to FIG. 1, heated crucible 10 which may be heated inductively or by any other convenient means includes a cylindrical wall 11 and an orifice plate 12. The orifice plate 12 is provided with an orifice 13 through which molten metal 14 is extruded to form a metal fiber. Hearth plate 16 is comprised of a flat disc surface 17 and a cylindrical wall 18 which is integrally connected to and is axially aligned with disc plate 17. Cylindrical wall 18 rests upon orifice plate 12 so as to separate disc surface 17 from orifice 13. Thus, hearth plate 16 creates a first reservoir 20 and second reservoir 21. Disc plate 17 is provided with a plurality of passageways 22 through which melt 14 passes as it moves from first reservoir 20 into second reservoir 21 and out through orifice 13. As shown in FIG. 1, the width of orifice 13 and the resulting cross-sectional area is substantially smaller than the width of passageways 22 and their resulting cross-sectional areas.

Figure 4:
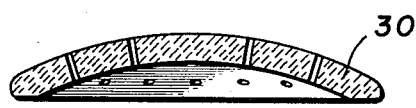
FIG. 4 is a section view taken along lines 4—4 of FIG. 3.
Figure 3:
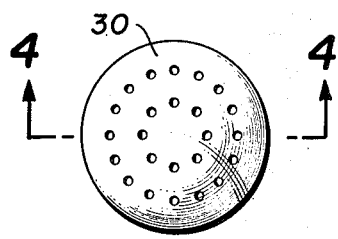
FIG. 3 is a plan view of a second embodiment hearth plate.
Figure 6:
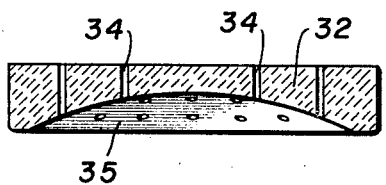
FIG. 6 is a section view taken along lines 6—6 of FIG. 5.
Figure 5:
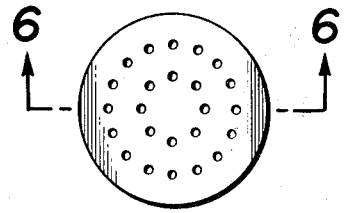
FIG. 5 is a plan view of a third embodiment hearth plate.

Hearth plate 30 which is the second embodiment as shown in FIGS. 3 and 4 is substantially dome-shaped to provide a second reservoir. The third embodiment hearth plate 32 as shown in FIGS. 5 and 6 is provided with an arcuated impression 33 and a plurality of passageways 34. The arcuated impression 33 in combination with orifice plate 12 provides orifice 13 with a second reservoir of substantially impurity free melt.

Figure 8:
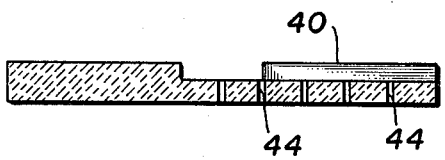
FIG. 8 is a section view taken along lines 8—8 of FIG. 7.
Figure 7:
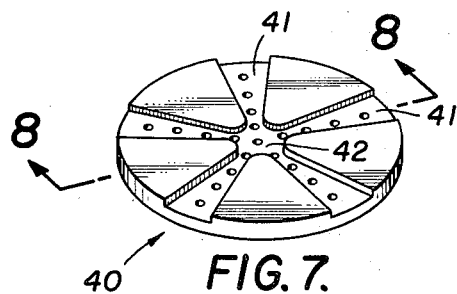
FIG. 7 is a perspective view of a fourth embodiment hearth plate.

Fourth embodiment hearth plate 40 as shown in FIGS. 7 and 8 is provided with a plurality of radially extending grooves 41 which intersect in the center thereof to form a cavity 42 which in combination with orifice plate 12 provides orifice 13 with a second reservoir of substantially impurity free melt. The melt passes through passageways 44, along radially extending grooves 41 to cavity 42 and exits crucible 11 through orifice 13.

In operation, a clean metallic charge is placed into crucible 11 and is heated to form a melt. Upon the melting of the charge, second reservoir 21 is filled with impurity free melt which enters that area through passageway 22 in hearth plate 16. As the melt exits orifice 13, the melt in second reservoir 21 is replenished by melt which is held in first reservoir 20. As the melt passes from first reservoir 20 through passageways 22 into second reservoir 21, the insoluble non-metallic film and particle inclusions are separated from the melt and deposited onto the upper surface of hearth plate 16 and are thus prevented from entering second reservoir 21 and ultimately clog orifice 13.

The hearth plates of this invention were manufactured from boron nitride; however, other materials may be used which are chemically inert to the spinning charges. For example, aluminum oxide, magnesium oxide, thorium dioxide and other ceramic materials having compatible thermodynamic stabilities are the most satisfactory materials for spinning metals.

*Example I.*—The heated crucible and the hearth plate of this example were constructed of boron nitride. A charge of aluminum metal was placed in the crucible and onto the hearth plate whereupon the crucible was heated to a temperature of substantially 800° C. The diameter of the orifice was 100 microns and the diameter of the passageways through the hearth plate was 500 microns. The charge was extruded through the orifice and formed an aluminum wire and there was no evidence of orifice plugging since all of the melt charge was extruded.

*Example II.*—The apparatus and conditions of Example I were repeated with the exception that the hearth plate was removed from the crucible. Orifice plugging occurred after only a few seconds had elapsed from the time the spinning began.

While preferred embodiments of the invention have been disclosed, it is to be understood that changes and variations may be made without departing from the spirit and scope of the invention. For example, the various hearth plates may be easily supported above the orifice by stake means or the like which extend inwardly from and are rigidly secured to the cylindrical wall. However, care must be taken to prevent the melt from entering the second reservoir without having passed through the passageways in the hearth plate. It has also been found that it is preferable that the cross-sectional area of the passageways be less than 0.003 square inch. The impurity removal effect diminishes as the area becomes larger than the above.

What is claimed is:
1. In an apparatus for spinning filaments from a metallic melt having impurities therein which unfiltered from the melt tend to disrupt continuous spinning operations, the combination of
   (a) a crucible adapted to contain said metallic melt;
   (b) an orifice plate forming the base of said crucible and having a spinning orifice therein; and
   (c) a means for removing the impurities in said metallic melt prior to movement thereof through said orifice, said means including a refractory plate spaced apart from and mounted intermediate of said orifice plate and the top of said crucible thereby dividing said crucible into first and second reservoirs, said refractory plate further characterized by being chemically inert to said metallic melt and having a plurality of passageways which communicate with said first and second reservoirs for passage of said metallic melt therethrough, said passageways each having a cross-sectional area larger than the cross-sectional area of said orifice.

2. The combination of claim 1 in which said refractory plate is made from a ceramic material selected from the group consisting of boron nitride, aluminum oxide, magnesium oxide, and thorium dioxide.

3. The combination of claim 1 in which the cross-sectional area of each said passageways is less than 0.003 square inch.

4. The combination of claim 3 in which said plate is a cylindrical disc with a planar upper surface and a concave lower surface, said passageways being arranged in a pattern of concentric circles about the center of said disc.

5. The combination of claim 3 in which said plate is a cylindrical disc with a convex upper surface and a concave lower surface, said passageways being arranged in a pattern of concentric circles about the center of said disc.

6. The combination of claim 3 in which said plate is a cylindrical disc with a plurality of radially extending grooves in the upper surface thereof intersecting to form a cavity in the central region of said disc, said passageways communicating with said upper reservoir through said grooves.

References Cited

UNITED STATES PATENTS

| | | | |
|---|---|---|---|
| 1,889,543 | 11/1932 | Coors | 210—477 X |
| 2,408,713 | 10/1946 | Webb | 18—8 |
| 2,517,711 | 8/1950 | Pool et al. | 18—8 |
| 3,248,191 | 4/1966 | Canfield | 18—8 X |

J. SPENCER OVERHOLSER, Primary Examiner

R. S. ANNEAR, Assistant Examiner

U.S. Cl. X.R.

18—8; 164—82, 134; 210—482; 266—37